(12) United States Patent
Davidson

(10) Patent No.: US 7,231,825 B2
(45) Date of Patent: Jun. 19, 2007

(54) ACCELEROMETER BASED TILT SENSOR AND METHOD FOR USING SAME

(75) Inventor: Lincoln Davidson, Moorhead, MN (US)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 10/983,445

(22) Filed: Nov. 8, 2004

(65) Prior Publication Data
US 2006/0100820 A1 May 11, 2006

(51) Int. Cl.
*G01P 3/04* (2006.01)
(52) U.S. Cl. ................................ 73/510
(58) Field of Classification Search .......... 73/510
See application file for complete search history.

(56) References Cited

U.S. PATENT DOCUMENTS 6,640,609 B1    11/2003  Nadkarni et al. ............. 73/1.37
2003/0095155 A1    5/2003  Johnson ........................ 715/864
2005/0160815 A1*   7/2005  Lee ............................ 73/514.15

FOREIGN PATENT DOCUMENTS

| DE | 10039978 | 5/2001 |
| DE | 10250321 | 6/2003 |
| EP | 1149 004 | 10/2001 |
| WO | WO 9819171 A1 * | 5/1998 |

* cited by examiner

*Primary Examiner*—Hezron Williams
*Assistant Examiner*—Tamiko Bellamy

(57) ABSTRACT

A tilt sensor and a method for the use of the tilt sensor to calculate the degree of tilt, whereby the tilt sensor has at least three accelerometers mounted to a base, the accelerometers are positioned in a common plane, and wherein each is preferably at an equally spaced angle from one another.

5 Claims, 1 Drawing Sheet

ACCELEROMETER BASED TILT SENSOR AND METHOD FOR USING SAME

BACKGROUND OF THE INVENTION

The present invention relates to inclinometers or tilt sensors and, more specifically, an accelerometer based tilt sensor and method for using the same.

Accelerometers are often mounted to various devices and are used to measure the degree of tilt of the device with respect to a horizontal axis. Accelerometers act under the acceleration of gravity and sense deviations in the gravitational field. Specifically, as an accelerometer is tilted at an angle with respect to the horizontal, the vertical component of the force of gravity acting on the accelerometer changes, causing the electronic components within the accelerometer to react differently, and varying the output reading of the accelerometer. Some accelerometers utilize a piezoelectric crystal and a mass whereby the changing angle of inclination causes the mass to apply varying pressure on the piezoelectric crystal, which produces the output signal. In other accelerometers, a capacitor and resistor are used to effectively create a mass-spring system whereby the output signal varies under the force of gravity with the tilt angle.

Conventional accelerometer based tilt sensors use a separate accelerometer for each axis of rotation. For example, a typical two-axis tilt sensor utilizes two accelerometers. For purposes of error correction, an additional accelerometer typically is used for each axis of rotation. In other words, to achieve redundancy with a two-axis tilt sensor, four accelerometers are necessary.

One disadvantage with conventional accelerometer based tilt sensors is that it is often difficult to determine whether the device is functioning properly. Many accelerometer based tilt sensors have built in self test modes that can verify proper functioning of the accelerometers. The weakness with these self test modes is that the accelerometer cannot react to inclination at the same time that it is in the test mode.

Another disadvantage of conventional tilt sensors is that, during installation, it often is difficult to precisely align the coordinate system of the accelerometers with the coordinate system of the desired measurements. Often such precision requires complicated manufacturing processes. Manufacturers often maintain precise control of the direction of the axes of the accelerometers with respect to the final assembled product. However, it is difficult to maintain the same level of precision between the accelerometer and the mounting points of the final product. Misalignment of the accelerometer's measuring axis reduces its sensitivity in the desired direction and increases cross-axis sensitivity, which is the sensitivity to acceleration in a direction orthogonal to the desired measurement axis.

Still another disadvantage of conventional tilt sensors is that it is difficult if not impossible to change the coordinate system of the final assembled product without changing the physical design so that it can be used in various applications with differing coordinate systems. The final product that measures tilt may be useful in many different products, each with its own coordinate system. Additionally, during the design phase of a product, the required mounting location and orientation of the tilt sensor may need to be changed. Because of these possibilities, it often is necessary to change coordinate systems without altering the tilt sensor.

It is therefore a primary object of the present invention to provide an accelerometer based tilt sensor that allows for error detection during normal operation.

Another primary object of the present invention is to provide a tilt sensor that can be easily aligned with and mounted on a device without the need for complicated manufacturing processes or adjustment of the tilt sensor components.

These and other objects will be apparent to those skilled in the art.

BRIEF SUMMARY OF THE INVENTION

A tilt sensor is provided, whereby the tilt sensor has at least three accelerometers mounted to a base and positioned in a common plane. Preferably, the accelerometers are equally spaced about the origin of the common plane, at approximately 120° angles with respect to one another. Additionally, the first accelerometer preferably is positioned at a 45° angle with respect to one of the axes of the common plane.

A method for using the tilt sensor to determine the angle of inclination based upon the accelerometer readings also is provided.

DESCRIPTION OF THE PREFERRED EMBODIMENTS OF THE INVENTION

Figure 1:
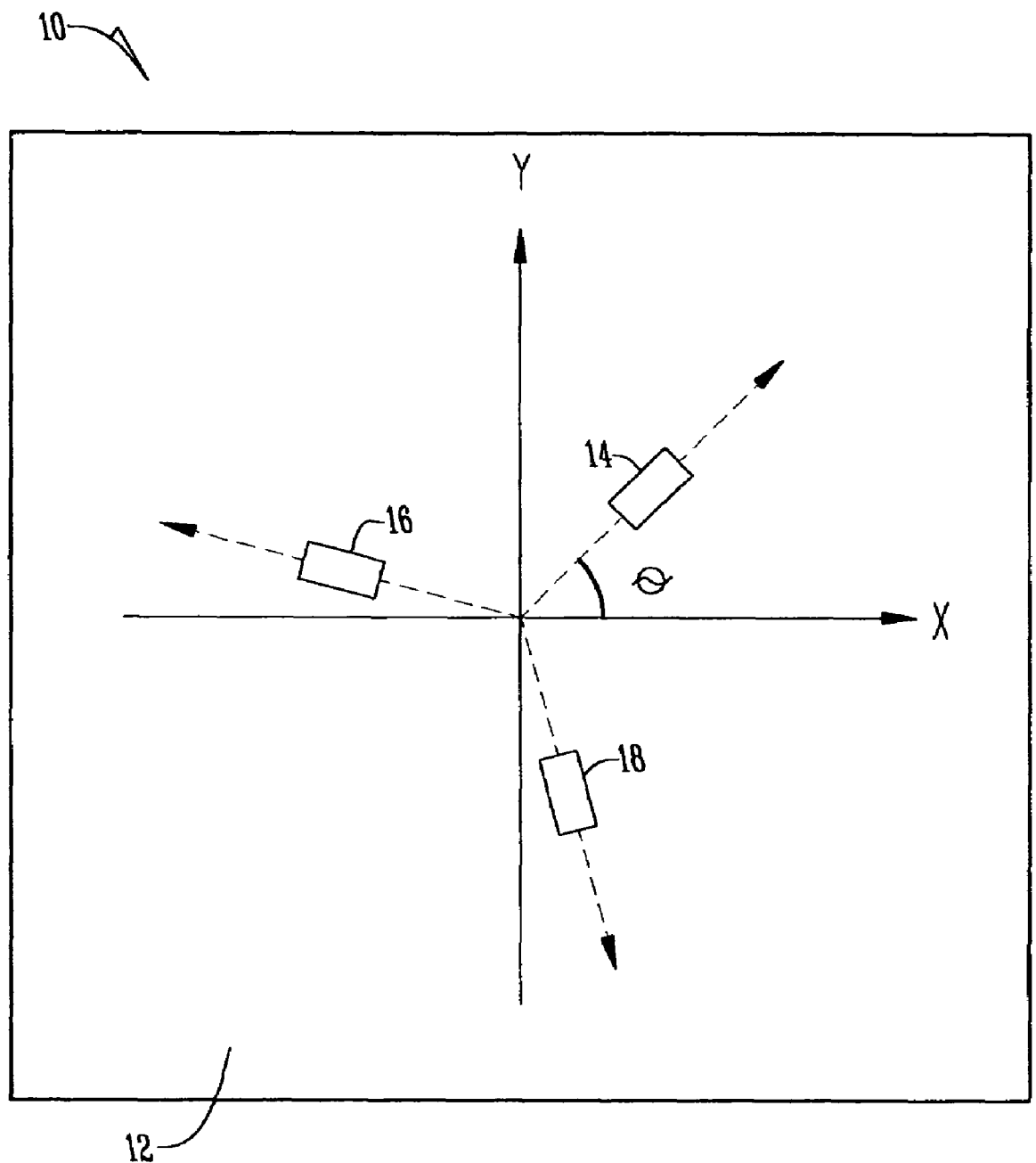
FIG. 1 is a plan view of an accelerometer based tilt sensor of the present invention.

With respect to FIG. 1, a tilt sensor 10 is provided having a base 12 for fixation to a final assembled product, such as heavy machinery or, in a simplified application, a carpenter's level. The base 12 may include a housing (not shown) and is made of any conventional material known in the art.

At least three accelerometers 14, 16, and 18 are mounted to the base 12, as shown in FIG. 1. The present invention contemplates that additional accelerometers may be used for redundancy or to sense tilt in more than two directions. Additionally, accelerometers 14-18 include any type of force-based accelerometer that sense deviations in the force of gravity with the degree of tilt.

The accelerometers 14-18 are positioned in a common plane, such as an X-Y plane. While the X and Y axes typically are associated with those axes parallel to the horizontal, any orientation of the axes is contemplated by the present invention, including a Z or vertical axis. Preferably, the accelerometers 14-18 are equally spaced about the origin of the common plane, as shown in FIG. 1, such that the accelerometers 14-18 are approximately 120° apart from one another. Further, the accelerometers 14-18 are preferably positioned such that the first accelerometer 14 is at an angle of approximately 45° with respect to the X-axis, as designated by the angle $\Theta$ in FIG. 1. The accelerometers 14-18 are fixed with respect to one another so that all three are subject to the same gravitational acceleration.

Two accelerometers, such as accelerometers 14 and 16, are sufficient for measuring tilt around the X and Y axes. The addition of the third accelerometer 18 provides redundancy in two directions, which can be used for error detection in the accelerometer readings. With accelerometers 14-18, the algebraic sum of the three accelerometer readings will always be zero. A non-zero sum indicates an error or an error term in one or more of the three readings and can be indicative of a faulty accelerometer.

It may not always be possible to position the accelerometers 14-18 exactly as shown in FIG. 1 and the sensitivity of each accelerometer may not be exactly as expected because of normal manufacturing tolerances. As such, each reading needs to be scaled by a constant multiplier before computing the sum. Additionally, the accelerometers 14-18 may have some sensitivity to acceleration along the Z or vertical axis.

For tilt angles of less than 25°, it has been found that the component of gravity along the Z-axis will not vary more than ten percent and can be treated as a constant. Accordingly, the sum of the accelerometer readings plus a constant is nearly equal to zero over a broad tilt range. If the sum exceeds a predetermined threshold, then there may be an error with one or more of the accelerometers.

In practice, the accelerometers 14-18 sense deviations in the force of gravity as the tilt sensor 10 tilts with respect to the horizontal. As such, the readings of the accelerometers 14-18 vary with the angle of inclination of the tilt sensor 10. From these readings, the X and Y-components of acceleration can be calculated, which are then used to derive the tilt angle. Specifically, the X-component of acceleration, $A_x$, is found by the weighted sum of the three accelerometer readings plus a constant, $C_x$, or:

$$A_x = C_x + A_1 C_{x1} + A_2 C_{x2} + A_3 C_{x3}$$

Where $A_1$ is the reading of accelerometer 14, $A_2$ is the reading of accelerometer 16, $A_3$ is the reading of accelerometer 18, $C_{x1}$ is the weighted coefficient for accelerometer 14, $C_{x2}$ is the weighted coefficient for accelerometer 16, and $C_{x3}$ is the weighted coefficient for accelerometer 18. One skilled in the art will understand that the multiplication of $A_1 C_{x1}$ creates a weighted acceleration value. The Y-component of acceleration, $A_y$, is found by a different weighted sum of the readings added to a different constant, $C_y$, or:

$$A_y = C_y + A_1 C_{y1} + A_2 C_{y2} + A_3 C_{y3}$$

Because of misalignment during manufacturing, it is difficult to know the actual orientations of the accelerometers, so the weighted coefficients for each accelerometer and the constants would be determined experimentally for maximum accuracy. Specifically, experimentation after the sensor 10 has been manufactured produces the best results. After computing the accelerations $A_x$ and $A_y$, an inverse sine function is then used to convert the accelerations to tilt angles with respect to the X and Y axes.

This approach of using a weighted sum of multiple accelerometers' readings to find the acceleration along a single axis can easily be extended to accommodate any number of additional accelerometers.

Using four accelerometers provides all the advantages of using three, but also provides enough information to determine which accelerometer is faulty in the case of a single accelerometer failure. If the four accelerometers are mounted every 45° at 0°, 45°, 90°, and 135°, any two could be used to compute tilt angle in the x and y directions, and any three could be used to compute tilt and detect errors. Four accelerometers give four unique sets of three accelerometers. If a single accelerometer fails, one of these four sets will not contain the faulty reading and can be used to get the correct acceleration values for the x and y axes. The other three sets will all contain the faulty reading and will indicate errors and should be ignored. Using four accelerometers in this manner provides error detection and correction in the case of a single accelerometer failure. And even with a single failed accelerometer, it still provides error detection that verifies that the remaining three accelerometers are functioning properly.

Changing the orientation of the X and Y axes can be accomplished by adjusting the coefficients and constants used to compute the accelerations in the X and Y directions. As such, none of the accelerometers 14-18 need to be changed or adjusted. The only restriction is that the new X-Y plane must remain parallel to the plane in which the accelerometers 14-18 are mounted.

It is therefore seen that through the use of three accelerometers aligned in a common plane, the present invention provides for redundancy in two directions during normal operation, thereby reducing the number of components used and eliminating complicated manufacturing processes.

What is claimed is:

1. A method of measuring the angle of tilt comprising the steps of:
    providing at least three accelerometers mounted to a base in a common plane;
    sensing the acceleration of gravity on each accelerometer;
    calculating the degree of tilt based on the sensed accelerations;
    determining a weighted sum of the accelerometers wherein a non-zero weighted sum indicates an error in at least one of the readings;
    wherein the weighted sum is an algebraic sum; and
    determining a weighted acceleration value for each accelerometer by multiplying each accelerometer's sensed acceleration by a weighting coefficient specific to each accelerometer; and
    computing the sum of the weighted acceleration values and adding a constant.

2. The method of claim 1 wherein the weighted coefficients and constant are determined from experimentation with the accelerometers after the device is manufactured.

3. A method of measuring the angle of tilt comprising the steps of:
    providing at least three accelerometers mounted to a base in a common plane;
    sensing the acceleration of gravity on each accelerometer;
    calculating the degree of tilt based on the sensed accelerations;
    wherein the step of calculating the degree of tilt based on the sensed acceleration further comprises the step of converting the sensed acceleration to degree of tilt using an inverse sine function;
    determining a weighted sum of the accelerometers where in a non-zero weighted sum indicates an error in at least one of the readings; wherein the error term is computed by calculating a weighted sum of the accelerometers' sensed accelerations and adding a constant; and
    wherein the weighted sum is an algebraic sum.

4. A method of measuring the angle of tilt comprising the steps of:
    providing at least three accelerometers mounted to a base in a common plane;
    sensing the acceleration of gravity on each accelerometer;
    calculating the degree of tilt based on the sensed accelerations;
    determining a weighted sum of the accelerometers wherein a non-zero weighted sum indicates an error in at least one of the readings; and
    wherein the error term is computed by calculating a weighted sum of the accelerometers' sensed accelerations and adding a constant.

5. The method of claim 4 wherein the weighted sum and constant are determined from experimentation with the accelerometers after the device is manufactured.

* * * * *